United States Patent
Kim et al.

(10) Patent No.: US 8,340,053 B2
(45) Date of Patent: Dec. 25, 2012

(54) WIRELESS SENSOR NETWORK AND METHOD FOR PERFORMING COMMUNICATION THEREIN

(75) Inventors: Eui Jik Kim, Suwon-si (KR); Sun Gi Kim, Seoul (KR); Hyo Hyun Choi, Seoul (KR); Jeong Geun Kim, Yongin-si (KR); Van Ca Phan, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1019 days.

(21) Appl. No.: 12/333,460

(22) Filed: Dec. 12, 2008

(65) Prior Publication Data

US 2009/0154437 A1    Jun. 18, 2009

(30) Foreign Application Priority Data

Dec. 13, 2007  (KR) .................. 10-2007-0129880

(51) Int. Cl.
  *H04W 84/02* (2009.01)
(52) U.S. Cl. ...................................................... 370/336
(58) Field of Classification Search .................. 370/329, 370/336, 337
See application file for complete search history.

(56) References Cited

U.S. PATENT DOCUMENTS

2008/0165709 A1*  7/2008  Soliman .................. 370/280
2009/0067389 A1*  3/2009  Lee et al. .................. 370/336

OTHER PUBLICATIONS

IEEE Std 802.15.4-2006, Part 15.4: Wireless Medium Access Control (MAC) and Physical Layer (PHY) Specifications for Low-Rate Wireless Personal Area Networks (WPANs), Sep. 2006, pp. 1-323.*

* cited by examiner

*Primary Examiner* — Melvin Marcelo
(74) *Attorney, Agent, or Firm* — Cha & Reiter, LLC

(57) ABSTRACT

A method for performing communication in the wireless sensor network is disclosed. The upper node transmits a beacon message to the lower nodes, wherein the beacon message distinguishes an indirect transmission interval, in which the upper node transmits downlink data to the plurality of lower nodes, from a direct transmission interval adjacent to the indirect transmission interval, in which the upper node receives uplink data from the plurality of lower nodes. The lower nodes determine the indirect transmission interval and the direct transmission interval from the received beacon message. The downlink data is transmitted from the upper node to the lower nodes in the indirect transmission interval. The uplink data is transmitted from the lower nodes to the upper node in the direct transmission interval. When communication is performed between the upper node and the lower nodes, the data can be efficiently transmitted from the upper node to the lower nodes.

11 Claims, 11 Drawing Sheets

FIG. 8

| bits : 0-2 | bits : 3-4 | bits : 5 | bits : 6-7 |
|---|---|---|---|
| Number of Extended Addresses Pending | Number of Short Addresses Pending | Dynamically allocated | Number of associating devices |
| 527 | 528 | 529 | 530 |

| Device 1 | Device 2 | ••• | Device m | Device 1 | Device 2 | ••• | Device n |
|---|---|---|---|---|---|---|---|

For the addresses of the associating devices [532]

For the addresses of the devices having pending data [533]

531

WIRELESS SENSOR NETWORK AND METHOD FOR PERFORMING COMMUNICATION THEREIN

CLAIM OF PRIORITY

This application claims the benefit of the earlier filing date, pursuant to 35 USC 119, to that patent application entitled "WIRELESS SENSOR NETWORK AND METHOD FOR PERFORMING COMMUNICATION THEREIN" filed in the Korean Intellectual Property Office on Dec. 13, 2007 and assigned Serial No. 2007-0129880, the contents of which are incorporated herein by reference.

BACKGROUND OF THE INVENTION

The present invention relates to wireless communication technology, and more particularly, to a wireless sensor network having an upper node that periodically transmits a beacon message and at least one lower node that communicates with the upper node in response to the received beacon message.

In general, wireless sensor network technology is classified into wireless local area network (WLAN) technology and wireless personal area network (WPAN) technology according to the recognition distance thereof. WLAN is based on IEEE 802.11 and enables devices to be connected to a backbone network within a radius of 100 m. On the other hand, WPAN is based on IEEE 802.15 and includes Bluetooth, Zigbee, and ultra wide band (UWB), and is used over a more limited range. Wireless sensor networks, in which wireless sensor network technology is established, are configured to include an upper node and lower nodes. The upper node and lower nodes are each operated by battery power.

In such a wireless sensor network, the upper node and lower nodes are permitted to communicate with each other only in a predetermined active interval in order to reduce power consumption. The upper node can transmit data to the lower nodes in the active interval. Since the lower nodes request data from the upper node based on competition-based channel linking, the efficiency of data transmission deteriorates from the upper node to the lower nodes. Therefore, the upper node and the lower nodes waste battery power. This problem worsens as the number of lower nodes communicating with the upper node increases.

SUMMARY OF THE INVENTION

The present invention provides a wireless sensor network having an upper node that periodically transmits a beacon message and at least one lower node that communicates with the upper node in response to the received beacon message.

Also, the present invention provides a method for performing communication in the wireless sensor network.

In accordance with an exemplary embodiment of the present invention, a method for performing communication in a wireless sensor network having at least one upper node and a plurality of lower nodes includes transmitting a beacon message to the lower nodes, wherein the beacon message distinguishes an indirect transmission interval, in which the upper node transmits downlink data to the plurality of lower nodes, from a direct transmission interval adjacent to the indirect transmission interval, in which the upper node receives uplink data from the plurality of lower nodes, determining the indirect transmission interval and the direct transmission interval from the beacon message received by the lower nodes, transmitting, in sequence, the downlink data from the upper node to the lower nodes in the indirect transmission interval and transmitting the uplink data from the lower nodes to the upper node in the direct transmission interval.

In accordance with another exemplary embodiment of the present invention, a wireless sensor network including at least one upper node and a plurality of lower nodes. The upper node transmits a beacon message to the lower nodes, wherein the beacon message includes an indirect transmission interval, in which downlink data is periodically transmitted to the plurality of lower nodes, and a direct transmission interval adjacent to the indirect transmission interval, in which uplink data is received from the plurality of lower nodes, and transmits, in sequence, the downlink data to the lower nodes in the indirect transmission interval. The lower node detects the indirect transmission interval and the direct transmission interval from the received beacon message, and transmits the uplink data to the upper node in the direct transmission interval.

BRIEF DESCRIPTION OF THE DRAWINGS

The features and advantages of the present invention will be more apparent from the following detailed description in conjunction with the accompanying drawings, in which:

FIG. 8 is a view illustrating the structure of the pending address specification field of FIG. 7;

FIG. 9 is a view illustrating the structure of the address list field of FIG. 7;

DETAILED DESCRIPTION OF THE INVENTION

Exemplary embodiments of the present invention are described in detail with reference to the accompanying drawings. The same reference numbers are used throughout the drawings to refer to the same or similar parts. For the purposes of clarity and simplicity, detailed descriptions of well-known functions and structures incorporated herein may be omitted to avoid obscuring the subject matter of the present invention.

Prior to explaining the embodiments of the present invention, terminologies are defined for the present description as follows:

The term "downlink data" refers to data that is collected by the upper node and provided from the upper node to the lower nodes. The term "uplink data" refers to data that is collected by the lower node and provided from the lower nodes to the upper node. The term "indirect transmission mode" refers to a mode wherein the upper node transmits messages or data to the lower nodes through a wireless sensor network only when the upper node receives a request from the lower nodes. The indirect transmission mode includes an association response mode wherein the upper node performs an association response in response to an association request of the lower nodes, and a data transmission mode wherein the upper node transmits downlink data to the lower nodes in response to a data request of the lower nodes. The association response mode and data transmission mode are performed at additionally separated intervals. The term "direct transmission mode" refers to a mode wherein the lower nodes transmit messages or data to the upper node through a wireless sensor network regardless of whether the upper node intends to receive data or messages. The direct transmission mode includes an association request mode wherein the upper node receives an association request from the lower nodes, and a data reception mode wherein the upper node receives uplink data from the lower nodes. The association request mode and the data reception mode can be performed simultaneously.

Figure 1A:
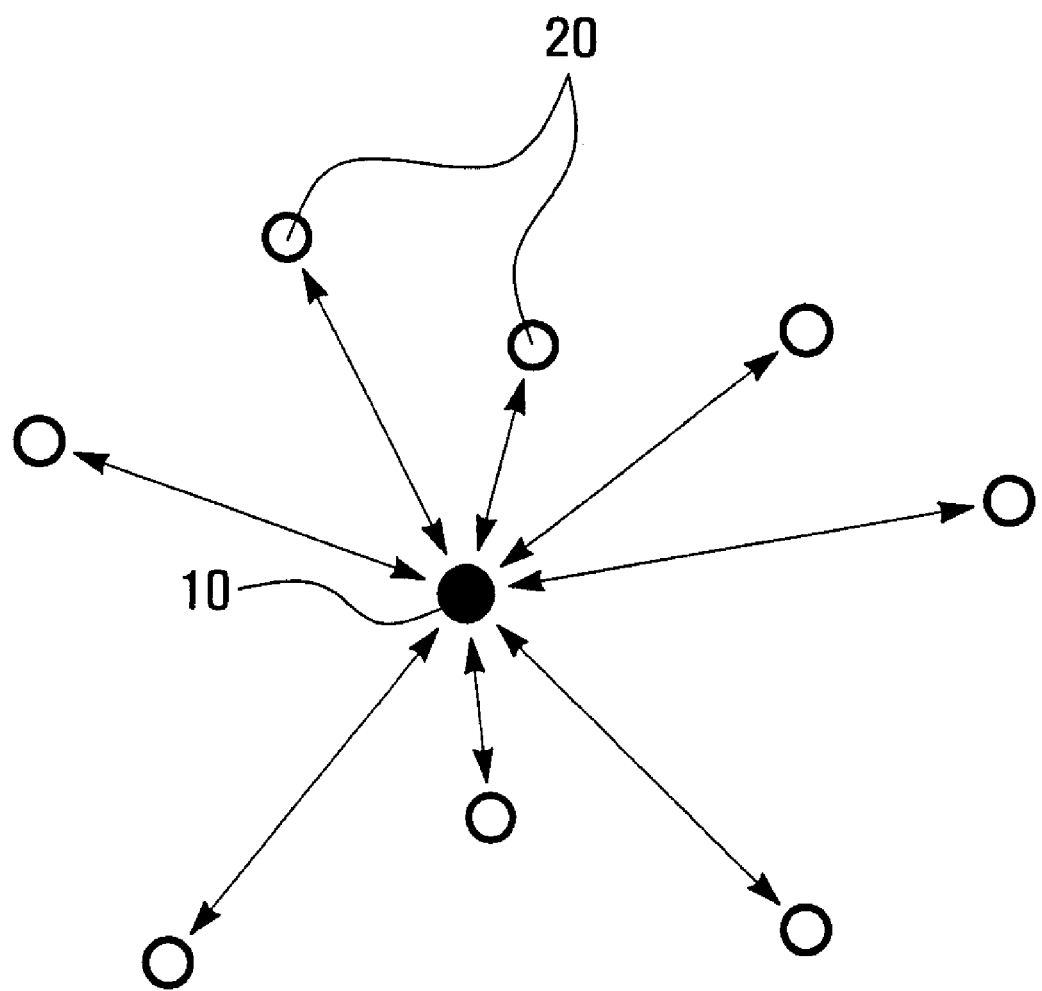
FIG. 1A and FIG. 1B are schematic structures of a wireless sensor network according to an embodiment of the present invention.
Figure 1B:
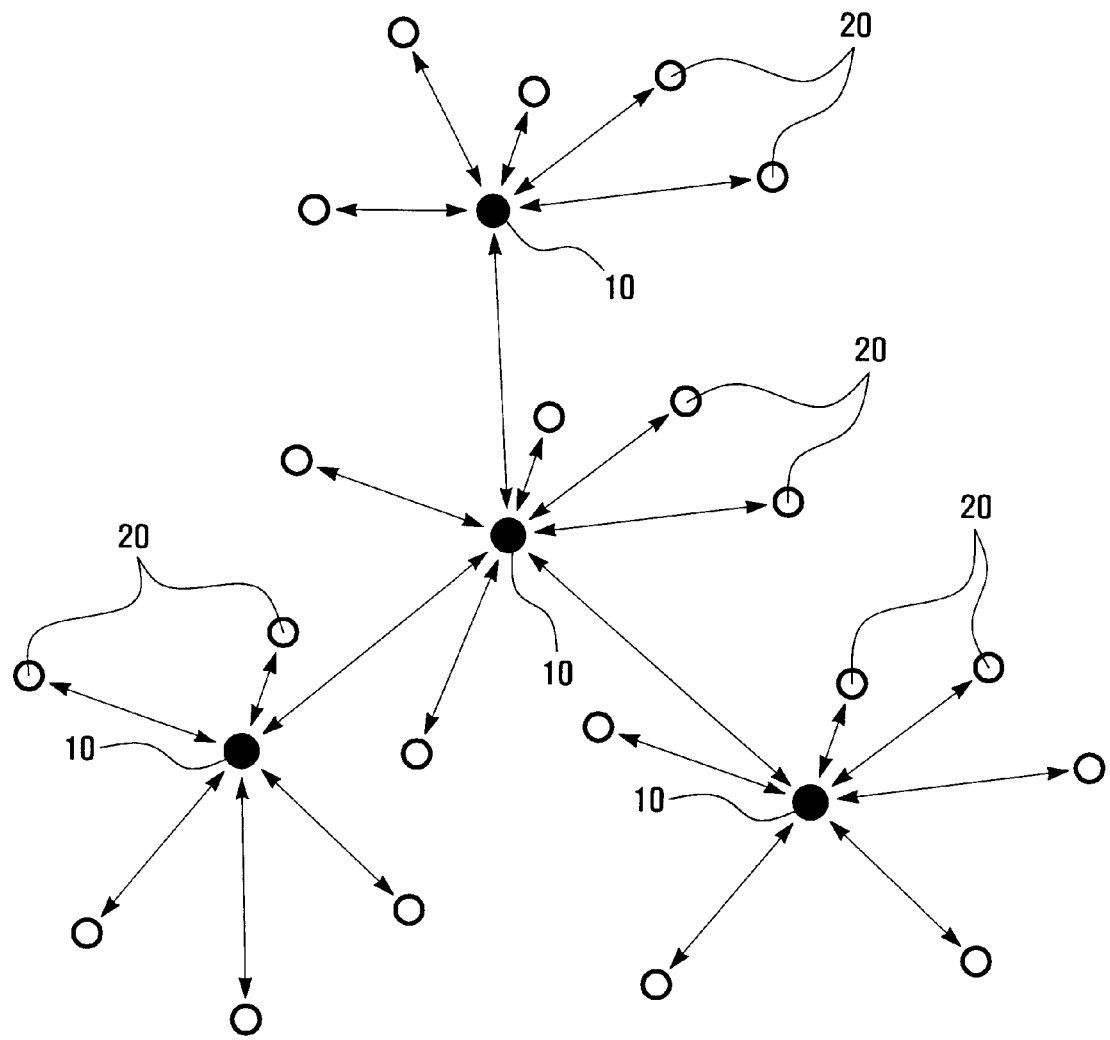

FIG. 1A and FIG. 1B are schematic structures of a wireless sensor network according to an embodiment of the present invention. In particular, FIG. 1A shows a star network and FIG. 1B shows a cluster tree network.

Referring to FIG. 1A and FIG. 1B, the wireless sensor network is configured to include an upper node 10 and a plurality of lower nodes 20 that are located within a certain area or range of the upper node 10 and communicate with the upper node 10. It should be understood that the wireless sensor network can be established through one upper node 10 as shown in FIG. 1A or through a plurality of upper nodes 10 as shown in FIG. 1B, in which the plurality of upper nodes 10 are hierarchically connected to each other. The upper node 10 periodically broadcasts beacon messages through the wireless sensor network. When receiving beacon messages, the lower nodes 20 can communicate with the upper node 10 in response to the received beacon messages. Communication between the upper node 10 and lower nodes 20 is performed based on a super frame.

Figure 2:
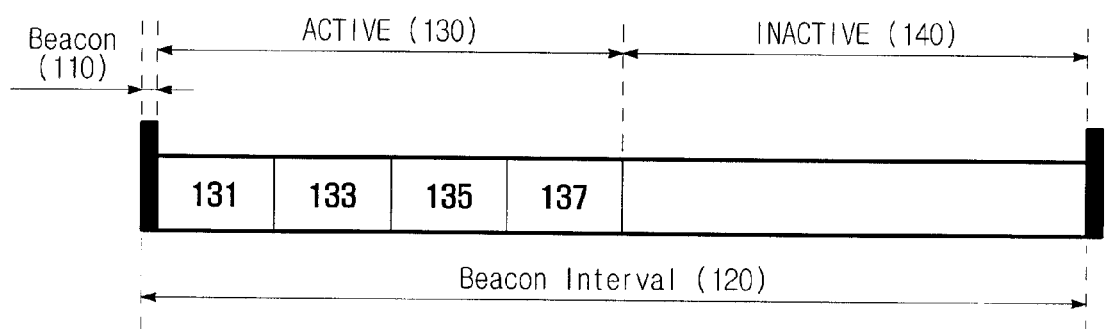
FIG. 2 is a view illustrating the structure of a super frame used in the wireless sensor network according to an embodiment of the present invention.

The super frame, which is used as a unit of communication in the wireless sensor network, is described with reference to FIG. 2. FIG. 2 is a view illustrating the structure of a super frame used in the wireless sensor network according to an embodiment of the present invention.

As shown in FIG. 2, the beacon interval 120 represents the amount of time between successive beacon messages 110 and is composed of an active interval 130 and inactive interval 140. In the active interval 130, the upper node 10 and the lower nodes 20 are switched to an ON state, i.e., an active state, so that they can transmit and receive data to and from each other via a channel. In the inactive interval 140, in order to conserve battery power, the upper node 10 and the lower nodes 20 are switched to an OFF state, i.e., an inactive state or low power consumption state, halting part of or the whole operation. The upper node 10 determines the length of the active interval 130 and the inactive interval 140, and the lower nodes 20 are notified thereof through the beacon message 110.

The active interval 130 includes an indirect transmission interval (131 and 133), a direct transmission interval 135, and a guaranteed time slot (GTS) 137. In the indirect transmission interval (131 and 133), the upper node 10 and the lower nodes 20 are operated in an indirect transmission node. In the direct transmission interval 135, the upper node 10 and the lower nodes 20 are operated in a direct transmission mode, i.e., an association request mode or data reception mode. Here, the indirect transmission interval (131 and 133) is composed of an association response interval 131 and a data transmission interval 133 which are adjacent to each other. In the association response interval 131, the upper node 10 and the lower nodes 20 are operated in an association response mode. In the data transmission interval 133, the upper node 10 and the lower nodes 20 are operated in a data transmission mode.

Figure 3:
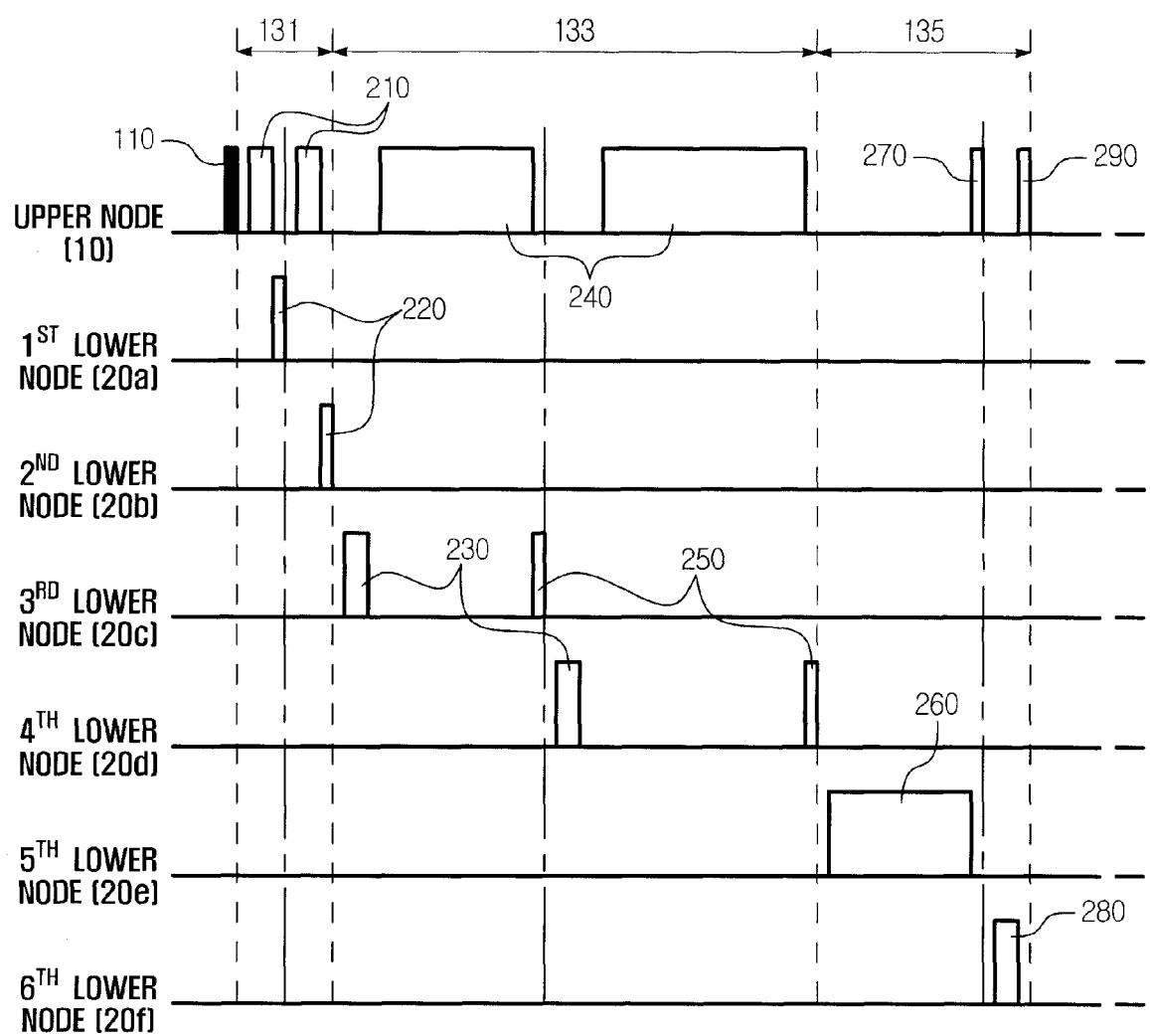
FIG. 3 is a timing chart that describes communication in a wireless sensor network according to an embodiment of the present invention.

In the following description, a communication procedure, performed in the wireless sensor network based on the super frame, is explained with reference to FIG. 3. FIG. 3 is a timing chart that describes communication in a wireless sensor network according to an embodiment of the present invention.

As shown in FIG. 3, the upper node 10 broadcasts a beacon message 110. The upper node 10 allocates at least one time slot to the indirect transmission interval (131 and 133). The upper node 10 allocates time slots to the lower nodes 20 (20a, 20b, 20c, 20d, 20e and 20f) for performing communication in the indirect transmission interval (131 and 133) to each of the lower nodes on a one-to-one basis, and then notifies the lower nodes 20 via the beacon message 110.

The upper node 10 and the lower nodes 20 (20a, 20b, 20c, 20d, 20e and 20f) receiving the beacon message 110 enter the association response interval 131. In the association response interval 131, the first lower node 20a and the second lower node 20b sequentially communicate with the upper node 10 in an association response mode. The first lower node 20a and second lower node 20b had previously transmitted association request messages including respective identification addresses to the upper node 10, and operate in an association response mode only when the beacon messages 110 include their respective identification addresses.

In this association response mode, the upper node 10 transmits association response messages 210 to the first lower node 20a during a time slot allocated to the first lower node 20a. When the first lower node 20a receives the association response messages 210, it transmits an acknowledgement message 220 to the upper node 10. Also, the upper node 10 transmits association response messages 210 to the second lower node 20b during a time slot allocated to the second lower node 20b. The second lower node 20b transmits an acknowledgement message 220 to the upper node 10 upon receiving the association response messages 210.

After that, the upper node 10 and the lower nodes 20 (20a, 20b, 20c, 20d, 20e and 20f) receiving the beacon message 110 enter the data transmission interval 133. In the data transmission interval 133, the third lower node 20c and the fourth lower node 20d sequentially communicate with the upper node 10 in a data transmission mode. Here, the third and fourth lower nodes 20c and 20d can be operated in the data transmission mode only when the beacon message 110 includes their respective identification addresses.

In this data transmission mode, the third lower node 20c transmits a data request message 230 to the upper node 10 during a time slot allocated to the third lower node 20c. The upper node 10 transmits downlink data 240 corresponding to the data request message to the third lower node 20c upon receiving the data request message 230. The third lower node 20c transmits an acknowledgement message 250 to the upper node 10 upon receiving the downlink data 240. Also, the fourth lower node 20d transmits a data request message 230 to the upper node 10 during a time slot allocated to the fourth lower node 20d. The upper node 10 transmits downlink data 240 corresponding to the data request message 230 to the fourth lower node 20d upon receiving the data request message 230. The fourth lower node 20d transmits an acknowledgement message 250 to the upper node 10 upon receiving the downlink data 240.

Since the lower nodes 20 (20a, 20b, 20c, 20d, 20e and 20f) can determine their respective allocated time slots, they communicate with the upper node 10 during the allocated time slots, thereby enhancing communication efficiency. Also, the lower nodes 20 (20a, 20b, 20c, 20d, 20e and 20f) are switched to an ON state during their respective allocated time slots and to an OFF state during times other than the allocated time slots to conserve battery power.

Next, the upper node 10 and the lower nodes 20 (20a, 20b, 20c, 20d, 20e and 20f) receiving the beacon message 110 enter the direct transmission interval 135. In the direct transmission interval 135, the fifth lower node 20e and sixth lower node 20f individually communicate with the upper node 10 in a direct transmission mode. In this direct transmission mode, the fifth lower node 20e transmits uplink data 260 to the upper node 10. The upper node 10 can transmit an acknowledgement message 270 to the fifth lower node 20e upon receiving the uplink data 260. Also, the sixth lower node 20f transmits an association request message 280 to the upper node 10. The upper node 10 can transmit an acknowledgement message to the sixth lower node 20f upon receiving the association request message 280.

After that, the upper node 10 and the lower nodes 20 (20a, 20b, 20c, 20d, 20e and 20f) enter the GTS interval 137 and inactive interval 140. In these intervals, the upper node 10 and the lower nodes 20 (20a, 20b, 20c, 20d, 20e and 20f) are operated in corresponding modes. Prior to transmitting a beacon, an upper node may transmit/receive a data limitedly with a lower node that requested a GTS allocation in the GTS intervals.

Figure 4:
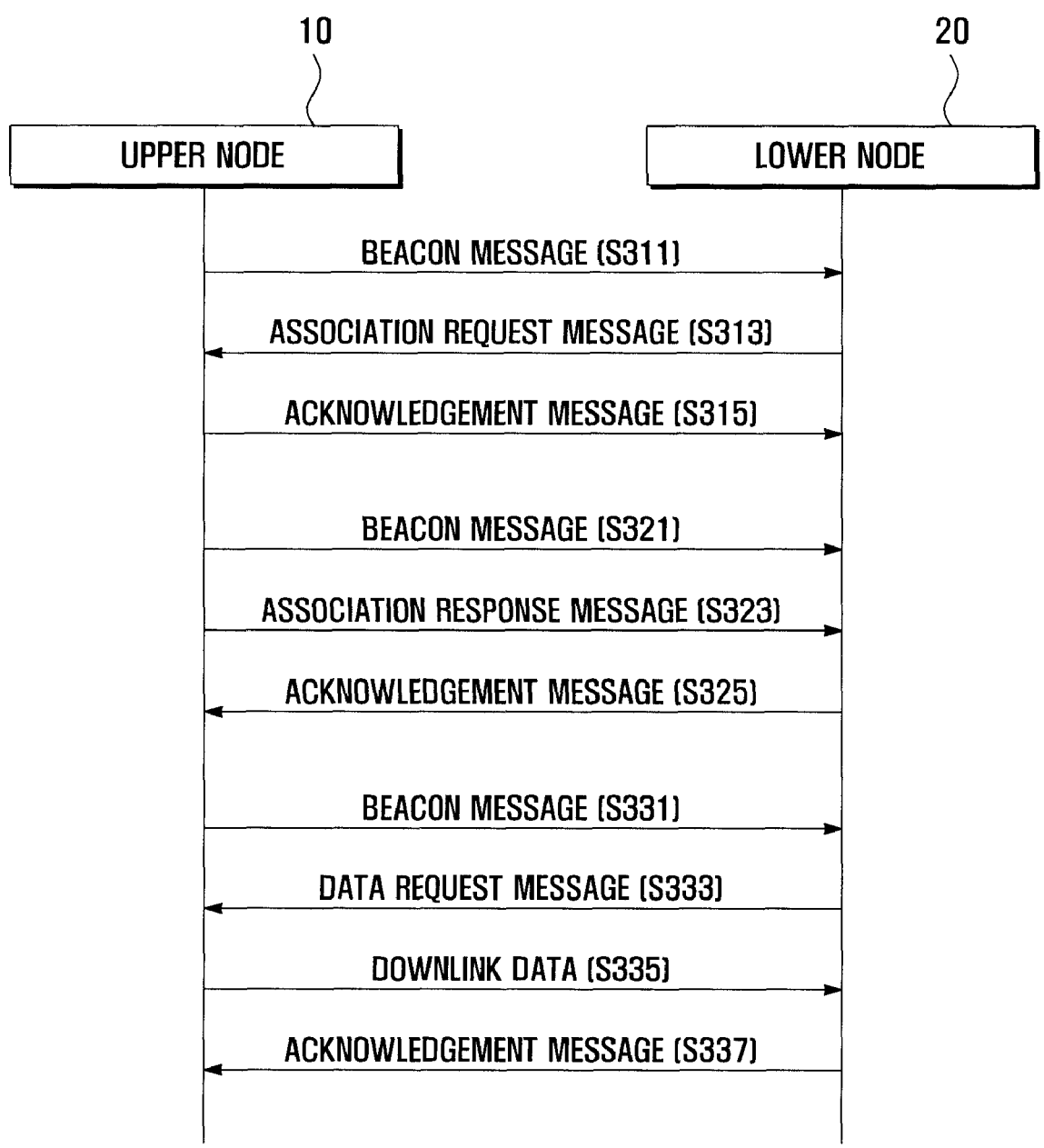
FIG. 4 is a view illustrating a communication procedure between an upper node and lower nodes, one-to-one, according to an embodiment of the present invention.

FIG. 4 is a view illustrating a communication procedure between an upper node and lower nodes, on a one-to-one basis, according to an embodiment of the present invention. This embodiment is described, assuming that the lower nodes are not associated with the upper node.

Referring to FIG. 4, the upper node 10 transmits a beacon message 110 to the lower node 20 (S311). Upon receiving the beacon message 110, the lower node 20 transmits an association request message 280 including its identification address to the upper node 10 (S313). Upon receiving the association request message 280, the upper node 10 transmits an acknowledgement message 290 to the lower node 20 (S315).

After the upper node 10 transmits the beacon message 110 at S311, the upper node 10 transmits another beacon message 110 to the lower node 20 (S321). The beacon message 110 transmitted at S321 includes an identification address of the lower node 20. Also, the beacon message 110 at S321 includes information as to a time slot of an association response interval 131 allocated to the particular lower node 20. After that, the upper node 10 transmits an association response message 210 to the lower node 20 (S323) corresponding to the association request message 280 of S313. The lower node 20 transmits an acknowledgement message 220 to the upper node 10 (S325), upon receiving the association response message 210.

After a number of periods elapse after the upper node 10 transmits the beacon message 110 at S321, the upper node 10 again transmits a beacon message 110 to the lower node 20 (S331). The beacon message 110 transmitted at S331 includes an identification address of the lower node 20. Also, the beacon message 110 includes information as to a time slot of a data transmission interval 133 allocated to the lower node 20. After that, the lower node 20 transmits a data request message 230 to the upper node 10 (S333), upon receiving the beacon message 110. The upper node 10 transmits downlink data 240 to the lower node 20 (S335), upon receiving the data request message 230. Although not shown in FIG. 4, the lower node 20 can further transmit an acknowledgement message notifying the upper node 10 that the data request message 230 has been received, upon receiving a data request message 230. The lower node 20 transmits an acknowledgement message 250 to the upper node 10 (S337), upon receiving downlink data 240.

Figure 5:
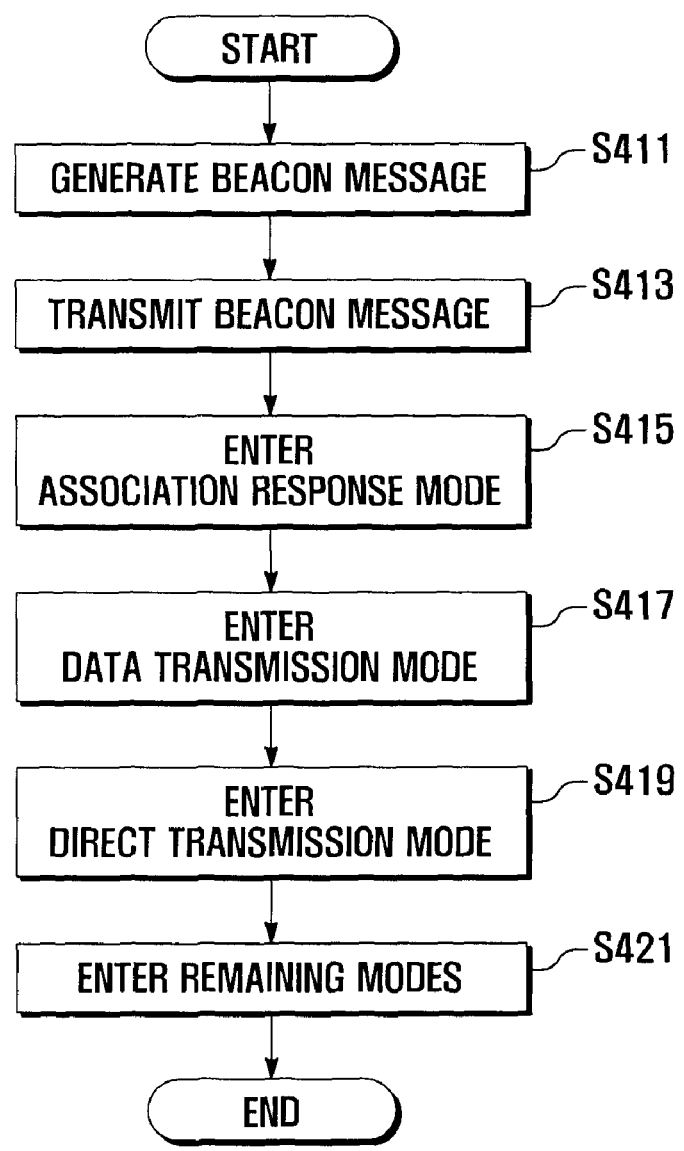
FIG. 5 is a flow chart describing communication performed in an upper node according to an embodiment of the present invention.

In communication between the upper node and the lower nodes, the operation of the upper node is described in detail with reference to FIG. 5. FIG. 5 is a flow chart describing communication performed in an upper node according to an embodiment of the present invention.

Referring to FIG. 5, the upper node 10 generates a beacon message 110 (S411). The upper node 10 determines the number of lower nodes 20 to be communicated with in the indirect transmission interval (131 and 133) and allocates at least one time slot to the indirect transmission interval (131 and 133). The upper node 10 allocates time slots to the identification addresses of the lower nodes 20 to be communicated with in the indirect transmission interval (131 and 133) on a one-to-one basis. After that, the upper node 10 determines the length of the active interval 130 and inactive interval 140. Also, the upper node 10 generates a beacon message 110 for notifying lower nodes of the structure of the determined super frame.

Figure 6:
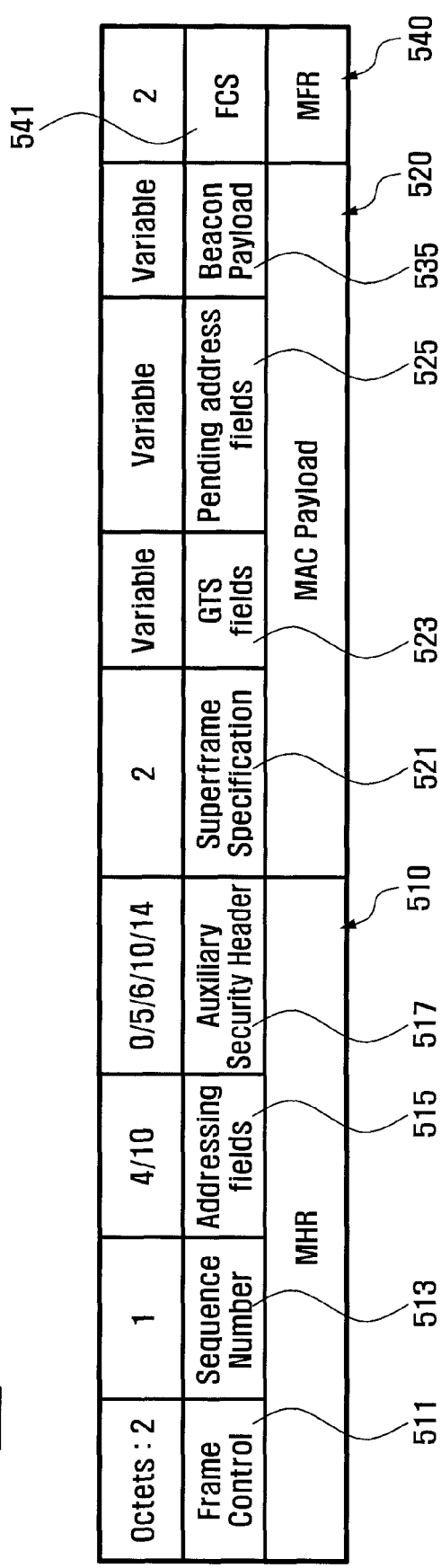
FIG. 6 is a view illustrating the structure of a beacon message according to an embodiment of the present invention.

The beacon message 110 is configured to have a structure as shown in FIG. 6, illustrating the structure of a beacon message used in IEEE 802.15.4 based upon WPAN, according to an embodiment of the present invention.

Referring to FIG. 6, the beacon message 110 is composed of a MAC HeadeR (MHR) 510, a MAC payload 520 and a MAC FooteR (MFR) 540.

The MHR 510 is composed of a MAC frame control field 511, a beacon sequence number (BSN) field 513, addressing fields 515 and an auxiliary security header field 517.

The MAC frame control field 511 includes information defining a type of frame, addressing fields and other control flags. The BSN field 513 includes the sequence number of the beacon message 110. The addressing fields 515 include identifier and identification addresses of the upper node 10 that transmits a beacon message 110. The auxiliary security header field 517 includes information necessary for a security process of a beacon message 110.

The MAC payload 520 is composed of a super frame specification field 521, GTS fields 523, a pending address field 525 and a beacon payload field 535. The super frame specification field 521 includes information defining the structure of the super frame. The GTS fields 523 include information representing GTS. The pending address field 525 includes information for configuring an indirect transmission interval (131 and 133). The beacon payload field 535 includes miscellaneous information.

The MFR 540 includes a frame check sequence (FCS) field 541 16 bits.

Figure 7:
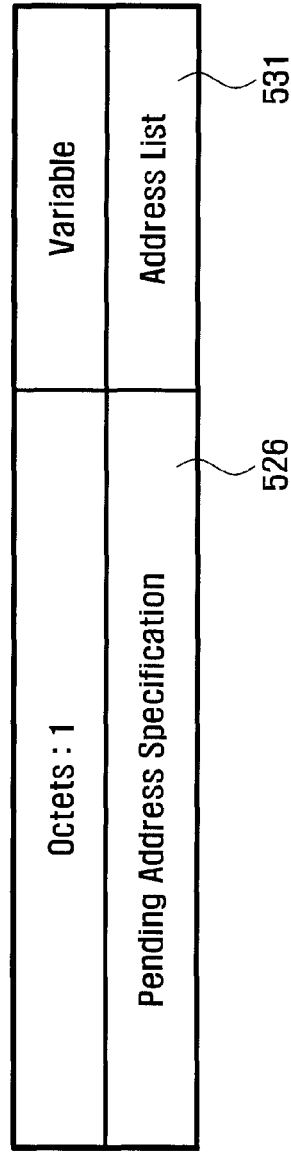
FIG. 7 is a view illustrating the structure of a pending address field of FIG. 6.

The pending address field is described in detail with reference to FIG. 7 to FIG. 9. FIG. 7 is a view illustrating the structure of a pending address field of FIG. 6. FIG. 8 is a view illustrating the structure of the pending address specification field of FIG. 7. FIG. 9 is a view illustrating the structure of the address list field of FIG. 7.

As shown in FIG. 7, the pending address field 525 is composed of a pending address specification field 526 and an address list field 531.

The pending address specification field 526, as shown in FIG. 8, includes a number of extended addresses pending sub-field 527, a number of short addresses pending sub-field 528, a sub-field 529 that is dynamically allocated and a number of associating devices sub-field 530. The sub-field 527 includes a number of extended addresses of 64 bit length that include the address list field 532 of the beacon message 110. The sub-field 528 includes the number of short addresses of 16 bit length that includes the address list field 532 of the beacon message 110. The sub-field 530 includes the number of lower nodes 20 that must transmit the association response message 210 in response to an association request message 280 that was previously received.

The address list field 531, as shown in FIG. 9, includes an address list 532 of the lower nodes 20 to be associated and an address list 533 of the lower nodes 20 that were previously associated. In the address list 532 of the lower nodes 20 to be associated, the addresses of the lower nodes 20 are arranged in the association response interval 131 in the same sequence as the time slots allocated to the respective lower nodes 20. The address list 532 of the lower nodes 20 also includes an amount of time consumed when an association response mode is performed for the respective addresses, i.e., transmission time of the association response message 210 and the acknowledgement message 220. In the address list 533 of the lower nodes 20 that were previously associated, the addresses of the lower nodes 20 are arranged in the data transmission interval 133 in the same sequence as the time slots allocated to the respective lower nodes 20. The address list 533 of the lower nodes 20 includes an amount of time consumed when a data transmission mode is performed for the respective addresses, i.e., transmission time of the data request message 230, downlink data 240 and acknowledgement message 250.

Referring back to FIG. 5, the upper node 10 transmits the beacon message 110 to the lower node (S413). The upper node 10 is operated in an association response mode (S415). That is, the upper node 10 performs an association response mode in the association response interval 131. The upper node 10 performs the association response mode based on time slots allocated to the association response interval 131. The upper node 10 sequentially performs the association response mode based on the address list 532 of the lower nodes 20 to be associated.

The upper node 10 is operated in a data transmission mode (S417) and performs a data transmission mode in the data transmission interval 133. The upper node 10 performs a data transmission mode based on the time slots allocated to the data transmission interval 133. That is, the upper node 10 sequentially performs the data transmission mode based on the address list 533 of the associated lower nodes 20.

The upper node 10 is operated in a direct transmission mode (S419). That is, the upper node 10 performs a direct transmission mode in the direct transmission interval 135. The upper node 10 receives uplink data 260 or an association request message 280 from the lower nodes 20. After that, the upper node 10 is operated in other modes (S421). That is, the upper node 10 performs corresponding modes in the GTS interval 137 and the inactive interval 140, The upper node 10 repeats S411 to S421 with a predetermined period.

Figure 10:
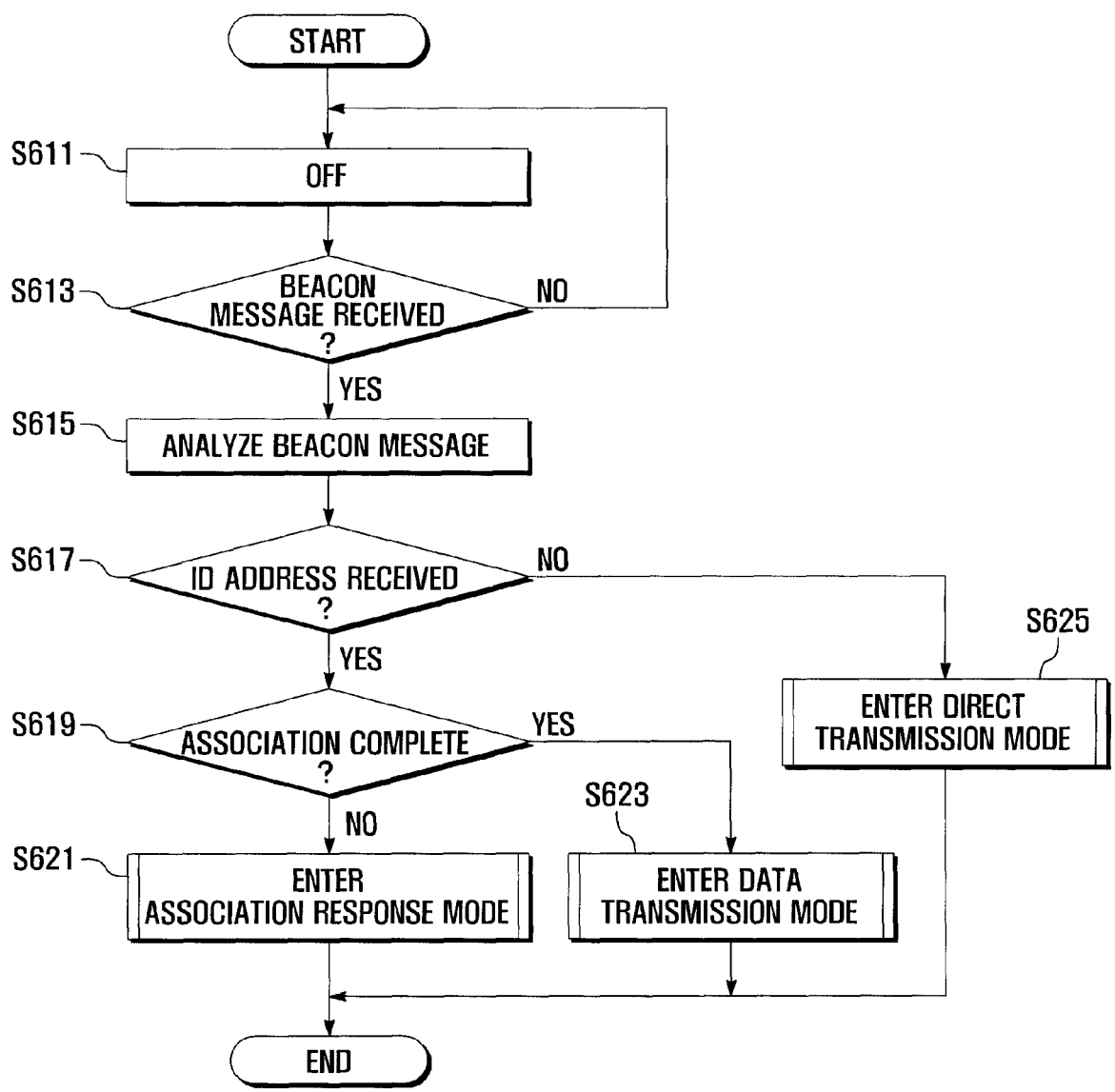
FIG. 10 is a flow chart describing communication performed in a lower node according to an embodiment of the present invention.

FIG. 10 is a flow chart describing communication performed in a lower node according to an embodiment of the present invention.

Referring to FIG. 10, the lower node 20 is shown in an OFF state (S611). When the lower node 20 receives a beacon message 110, the lower node 20 detects the beacon message 110 (S613) and analyzes the beacon message 110 (S615). The lower node 20 distinguishes between the indirect transmission interval 131 and 133, i.e., an association response interval 131 and a data transmission interval 133, and the direct transmission interval 135 from the beacon message 110. The lower node 20 then determines whether the beacon message 110 includes its identification addresses (S617).

The lower node 20 determines whether the association is complete (S619), upon concluding that the beacon message 110 includes its identification address at S617. That is, the lower node 20 receives the association response message 210 from the upper node 10 and determines whether the lower node 20 is already associated with the upper node 10. The lower node 20 determines a location of the identification address in the address list field 531 of the beacon message 110, and determines whether the association is complete according to the determined location of its identification address.

The lower node 20 is operated in an association response mode (S621), upon concluding that the association is not complete at S619. That is, the lower node 20 is operated in an association response mode upon determining that the identification address of the lower node 20 is located in the address list 532 of the address list field 531 of the beacon message 110.

Figure 11:
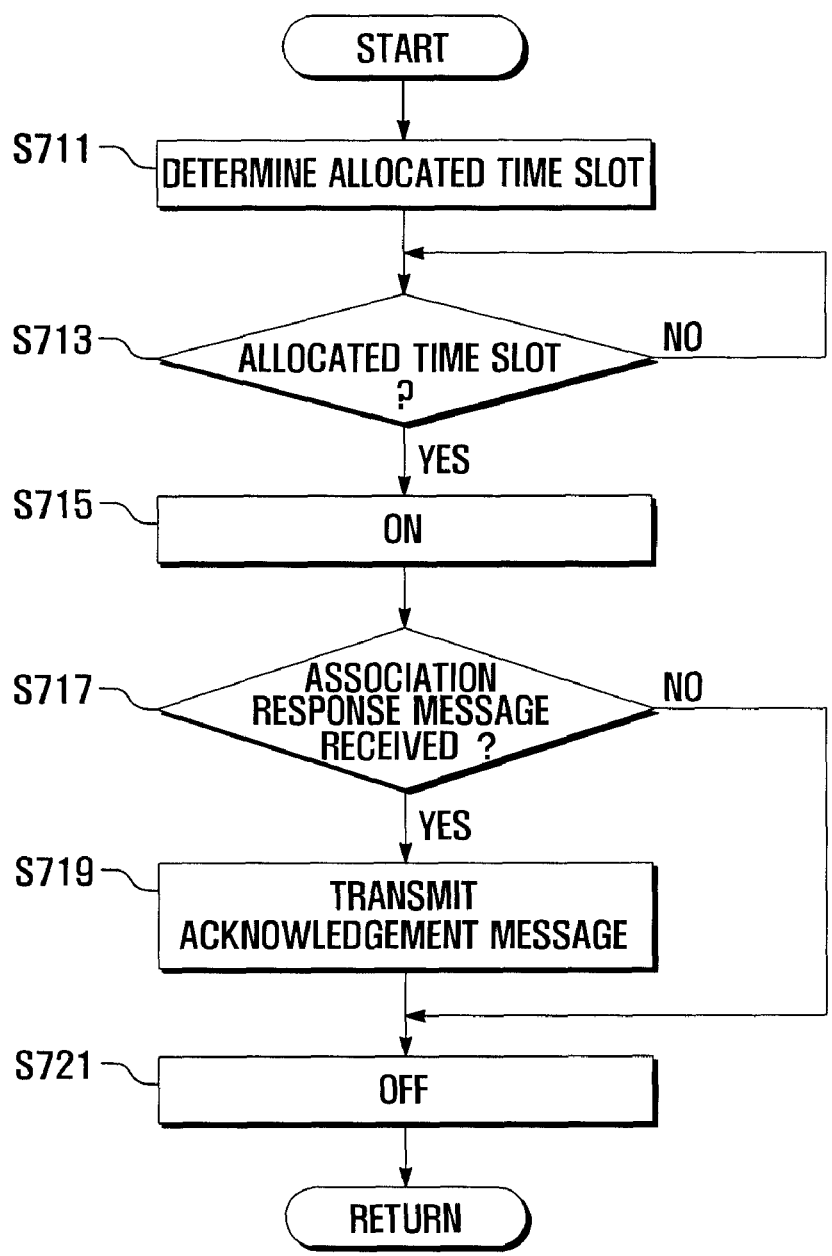
FIG. 11 is a flow chart describing an operation of the lower node in an association response mode shown in FIG. 10.

FIG. 11 is a flow chart describing an operation of the lower node in an association response mode as shown in FIG. 10.

Referring to FIG. 11, the lower node 20 determines an allocated time slot in response to an identification address (S711). The lower node 20 determines a time slot corresponding to the association response interval 131. The lower node 20 determines the allocated time slot (S713) and is switched to an ON state (S715). The lower node 20 receives the association response message 210 (S717) and transmits an acknowledgement message 220 for notifying the upper node that the association response message 210 has been received (S719). The lower node 20 is then switched to an OFF state (S721) and returns to the procedure of FIG. 10. On the other hand, when the lower node 20 does not receive the association response message 210 at S717, it is switched to an OFF state at S721 and then returns to the procedure of FIG. 10. That is, the lower node 20 is switched to an ON state only for the allocated time slot and is maintained in an OFF state for a time other than the time slot allocated for lower node 20.

Referring back to FIG. 10, the lower node 20 is operated in a data transmission mode (S623) upon concluding that the association is complete at S619. That is, the lower node 20 is operated in a data transmission mode upon determining that the identification address of the lower node 20 is located in the address list 533 of the address list field 531 of the beacon message 110.

Figure 12:
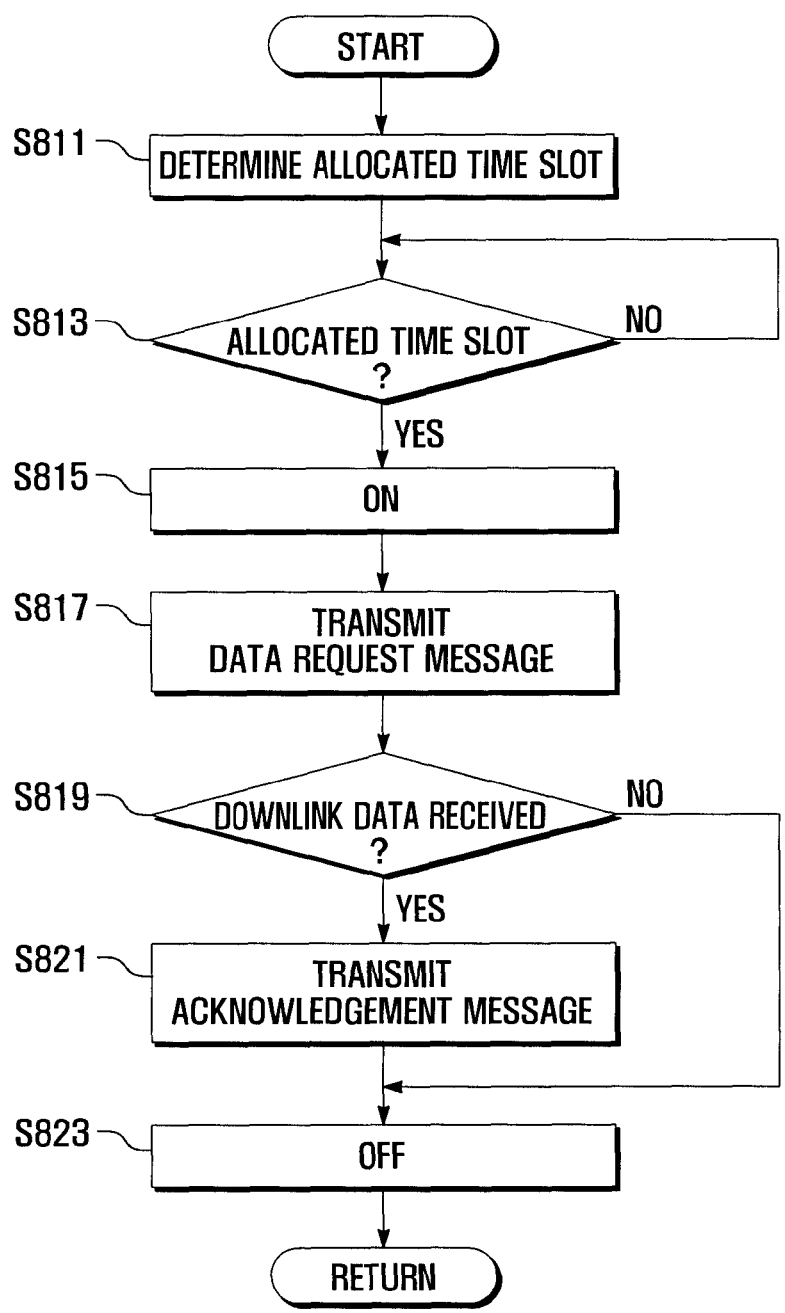
FIG. 12 is a flow chart describing an operation of the lower node in a data transmission mode as shown in FIG. 10.

FIG. 12 is a flow chart describing an operation of the lower node in a data transmission mode as shown in FIG. 10.

Referring to FIG. 12, the lower node 20 determines its allocated time slot in response to an identification address (S811). The lower node 20 determines its time slot in the data transmission interval 133. The lower node 20 determines its allocated time slot (S813) and is switched to an ON state (S815). The lower node 20 transmits a data request message 230 (S817). The lower node 20 detects the downlink data 240 (S819) and transmits an acknowledgement message 250 for notifying the upper link that the downlink data 240 has been received (S821). The lower node 20 is then switched to an OFF state (S823) and returns to the procedure of FIG. 10. On the other hand, when the lower node 20 does not receive the downlink data 240 at S819, it is switched to an OFF state at S823 and then returns to the procedure of FIG. 10. That is, the lower node 20 is switched to an ON state only for the allocated time slot and is maintained at an OFF state for times other than the allocated time slot.

Referring back to FIG. 10, the lower node 20 is operated in a direct transmission mode (S625) upon concluding that the identification address is not included in the beacon message 110. That is, the lower node 20 performs a direct transmission mode in the direct transmission interval 135. The lower node 20 transmits an association request message 280 or uplink data 260 to the upper node 10.

Figure 13:
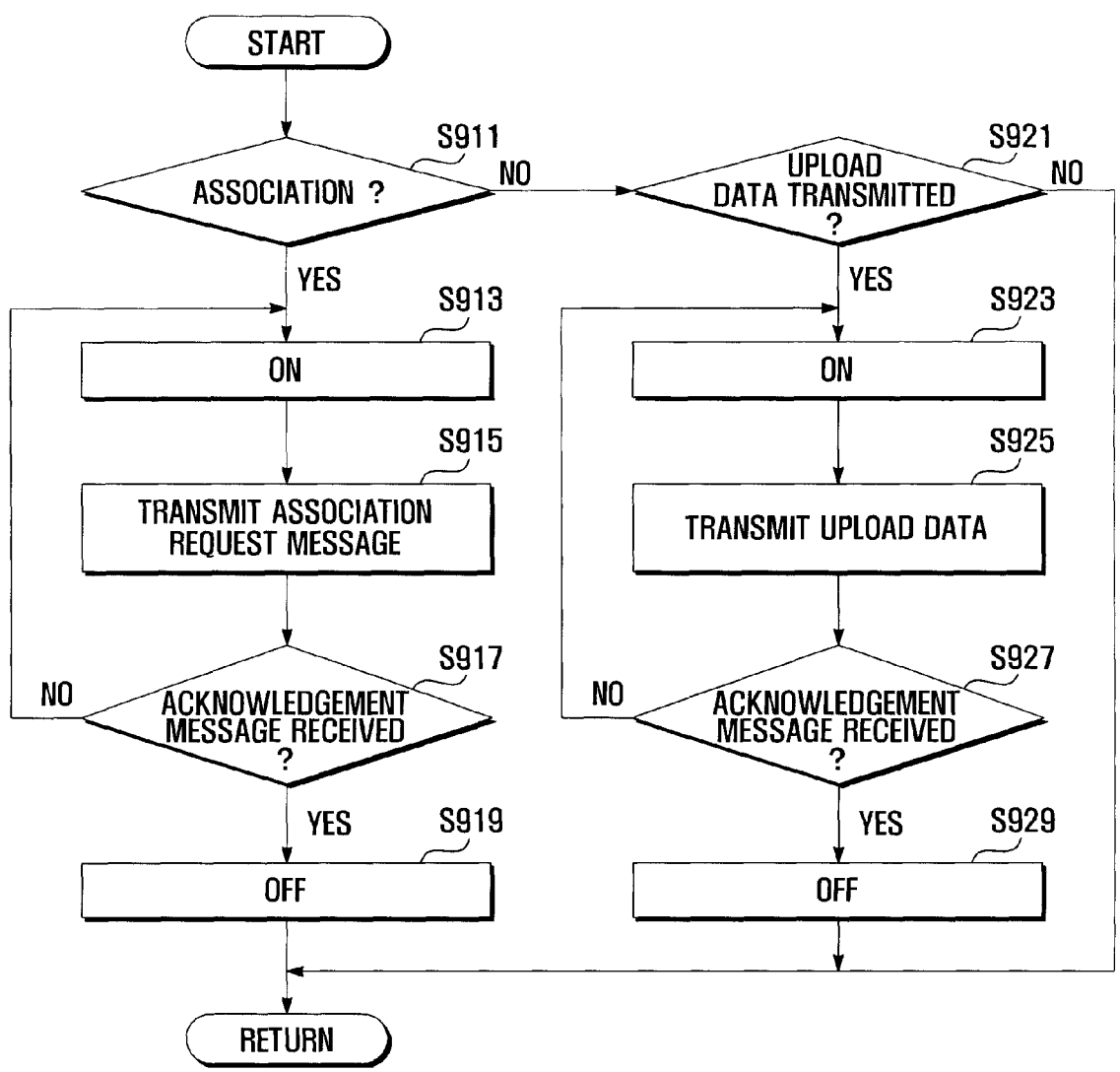
FIG. 13 is a flow chart describing an operation of the lower node in a direct transmission mode as shown in FIG. 10.

FIG. 13 is a flow chart describing an operation of the lower node in a direct transmission mode as shown in FIG. 10.

Referring to FIG. 13, the lower node 20 determines whether to be associated with the upper node 10 (S911). When the lower node 20 concludes that the lower node 20 should be associated with the upper node 10 at S911, the lower node 20 is switched to an ON state (S913). The lower node 20 transmits an association request message 280 to the upper node 10 (S915). The lower node 20 determines whether to receive an acknowledgement message 290 in response to the association request message 280 from the upper node 10 (S917). The lower node 20 is switched to an OFF state (S919) and returns to the procedure of FIG. 10, upon receiving the acknowledgement message 290 from the upper node 10.

When the lower node 20 concludes that the lower node 20 does not have to be associated with the upper node 10 at S911, the lower node 20 determines whether there is uplink data 260 to be transmitted (S921). The lower node 20 is switched to an ON state (S923), upon concluding that there is uplink data 260 to be transmitted at S921. After that, the lower node 20 transmits the uplink data 260 to the upper node 10 (S925). The lower node 20 determines whether to receive an acknowledgement message 270 in response to the uplink data from the upper node 10 (S927). The lower node 20 is switched to an OFF state (S929) and returns to the procedure of FIG. 10, upon receiving the acknowledgement message 270 from the upper node 10.

The lower node 20 maintains an OFF state and returns to the procedure of FIG. 10 upon concluding that there is no uplink data 260 to be transmitted therein at S921.

The lower node 20 repeatedly performs the procedure of FIG. 10 from S611 to S625.

In the embodiment described above, the lower node is operated in any one of an association response mode, a data transmission mode and a direct transmission mode upon receiving a beacon message, however, it should be understood that the present invention is not limited by the embodiment. That is, the present invention can be implemented in such a way that the lower node can be operated in the indirect transmission mode or the direct transmission mode in a single active interval. For example, the lower node can be operated in the direct transmission mode, although the identification address is included in the beacon message. That is, the lower node can be operated in an association response mode or a data transmission mode in the indirect transmission interval upon receiving the beacon message. When allocated time slots exist, the lower node is switched to an ON state during a corresponding allocated time slot and is then operated in the indirect transmission mode. After that, the lower node is switched to an OFF state. In addition, the lower node can be further operated in a direct transmission mode in the direct transmission mode. The lower node is switched to an ON state and operated in the direct transmission mode. After that, the lower node is switched to an OFF state.

In the embodiment of the present invention, the active interval is divided into at least two or more intervals in each of which different modes are performed. That is, the upper node and lower nodes are operated in an indirect transmission mode in an indirect transmission interval and operated in a direct transmission mode in a direct transmission interval. Also, since time slots are allocated to the indirect transmission interval, the upper node is communicated with the lower nodes during respective time slots on a one-to-one basis. Therefore, when the upper node and a plurality of lower nodes are communicated with each other, a bottleneck phenomenon, in which various messages and data are simultaneously intensively centralized in the upper node, can be prevented. Furthermore, the lower nodes are each switched to an ON state only during a corresponding time slot in the indirect transmission interval, and maintained in an OFF state during other times. Therefore, the present invention can reduce battery power consumption in the upper node and lower nodes.

As described in the foregoing, a method for performing communication in the wireless sensor network, an active interval is divided into at least two intervals in which different modes are performed. That is, the upper node and lower nodes are operated in an indirect transmission mode in an indirect transmission interval and operated in a direct transmission mode in a direct transmission interval, and time slots are allocated to the indirect transmission interval, in which the upper node communicates with the lower nodes during respective time slots on a one-to-one basis. Therefore, a competition process does not occur that may be generated as a plurality of lower nodes request data from the upper node. Also, the lower node is switched to an ON state only during time for a corresponding allocated time slot in the indirect transmission interval and is maintained in an OFF state at other times. Therefore, the battery power consumption can be reduced in the upper node and lower nodes.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method for performing communication by a lower node in a wireless sensor network having at least one upper node and a plurality of lower nodes including the lower node, comprising:
   receiving a beacon message from the upper node, wherein the beacon message distinguishes an indirect transmission interval, in which the upper node transmits downlink data to at least one receiving lower node of the plurality of lower nodes, from a direct transmission interval adjacent to the indirect transmission interval, in which the upper node receives uplink data from at least one transmitting lower node of the plurality of lower nodes;

determining the indirect transmission interval and the direct transmission interval from the beacon message received;

determining whether a time slot is allocated to the lower node from the beacon message received;

receiving, if the time slot is allocated to the lower node, the downlink data from the upper node in the indirect transmission interval;

transmitting the uplink data to the upper node in the direct transmission interval;

switching an OFF state to an ON state in the lower node during the allocated time slot to the lower node; and switching to the OFF state in the lower node when receiving the downlink data is completed;

wherein the upper node allocates at least one time slot to the indirect transmission interval, allocates the time slot to at least one of the lower nodes, and generates the beacon message.

2. The method of claim 1, wherein the allocated time slot is longer than a transmission time of the downlink data.

3. The method of claim 1, wherein transmitting the uplink data in the direct transmission interval comprises:

switching from an OFF state to an ON state in the lower node in the direct transmission interval;

transmitting, after switching to the ON state, the uplink data to the upper node; and switching, after transmitting the uplink data, to the OFF state in the lower node.

4. The method of claim 1, wherein the upper node divides the indirect transmission interval in the beacon message into an association response interval, in which an association response message is transmitted in response to a previously received association request message, and a data transmission interval in which the downlink data is transmitted to the lower nodes previously associated with, in the upper node.

5. The method of claim 4, wherein receiving the downlink data in the indirect transmission interval comprises:

receiving an association response message from the upper node in the association response interval; and receiving the downlink data from the upper node in the data transmission interval.

6. The method of claim 4, wherein transmitting the uplink data in the direct transmission interval further comprises:

transmitting the association request message to the upper node.

7. A lower node in a wireless sensor network comprising at least one upper node and a plurality of lower nodes including the lower node, the lower node comprising:

a processor in communication with a memory, the memory including code which when accessed by the processor causes the processor to execute the steps of:

receiving a beacon message from the upper node, wherein the beacon message distinguishes an indirect transmission interval, in which the upper node transmits downlink data to at least one receiving lower node of the plurality of lower nodes, from a direct transmission interval adjacent to the indirect transmission interval, in which the upper node receives uplink data from at least one transmitting lower node of the plurality of lower nodes;

determining the indirect transmission interval and the direct transmission interval from the beacon message received;

determining whether a time slot is allocated to the lower node from the beacon message received;

receiving, if the time slot is allocated to the lower node, the downlink data from the upper node in the indirect transmission interval;

transmitting the uplink data to the upper node in the direct transmission interval;

switching an OFF state to an ON state in the lower node during the allocated time slot to the lower node; and switching to the OFF state in the lower node when receiving the downlink data is completed;

wherein the upper node allocates at least one time slot to the indirect transmission interval, allocates the time slot to at least one of the lower nodes, and generates the beacon message.

8. The lower node of claim 7, wherein the lower node switches from an OFF state to an ON state in the lower node in the direct transmission mode, transmits, after switching to the ON state, the uplink data from the lower nodes to the upper node, and switches, after transmitting the uplink data, to the OFF state in the lower node.

9. The lower node of claim 7, wherein, the upper node divides the indirect transmission interval in the beacon message into an association response interval, in which an association response message is transmitted in response to a received association request message, and a data transmission interval in which the downlink data is transmitted to the previously associated lower nodes.

10. The lower node of claim 9, wherein the lower node receives an association response message in the association response interval; and receives the downlink data in the data transmission interval.

11. The lower node of claim 9, wherein the lower node transmits the association request message to the upper node in the direct transmission mode.

* * * * *